US009398084B2

(12) United States Patent
Matsushima et al.

(10) Patent No.: US 9,398,084 B2
(45) Date of Patent: *Jul. 19, 2016

(54) INFORMATION PROCESSING SYSTEM

(71) Applicant: RICOH COMPANY, LTD., Tokyo (JP)

(72) Inventors: Hiroyuki Matsushima, Kanagawa (JP); Tatsuya Shirai, Kanagawa (JP); Akihiro Kanomune, Tokyo (JP); Hiroshi Ota, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/855,474

(22) Filed: Sep. 16, 2015

(65) Prior Publication Data
US 2016/0006796 A1 Jan. 7, 2016

Related U.S. Application Data

(63) Continuation of application No. 14/171,923, filed on Feb. 4, 2014, now Pat. No. 9,172,746.

(30) Foreign Application Priority Data

Feb. 6, 2013 (JP) .................................. 2013-021574
Jan. 21, 2014 (JP) .................................. 2014-008663

(51) Int. Cl.
*G06F 21/00* (2013.01)
*H04L 29/08* (2006.01)
*H04L 29/06* (2006.01)

(52) U.S. Cl.
CPC ............... *H04L 67/10* (2013.01); *H04L 63/02* (2013.01); *H04L 63/0209* (2013.01); *H04L 63/0227* (2013.01); *H04L 63/08* (2013.01); *H04L 67/141* (2013.01); *H04L 67/40* (2013.01); *H04L 69/321* (2013.01)

(58) Field of Classification Search
CPC ........................................................ H04L 63/10
See application file for complete search history.

(56) References Cited

U.S. PATENT DOCUMENTS

| | | | | |
|---|---|---|---|---|
| 2005/0240372 A1* | 10/2005 | Monk | ................ | H04L 12/2602 702/122 |
| 2008/0104615 A1* | 5/2008 | Nolan | ................... | G06F 19/322 719/328 |
| 2011/0205586 A1* | 8/2011 | Takahashi | ............ | G06F 9/5027 358/1.15 |
| 2012/0011521 A1* | 1/2012 | Knoodle | ................. | G06F 9/541 719/328 |
| 2012/0185913 A1* | 7/2012 | Martinez | ................ | G06F 9/455 726/1 |
| 2013/0018994 A1* | 1/2013 | Flavel | ................ | H04L 41/0806 709/220 |
| 2013/0103834 A1* | 4/2013 | Dzerve | ................... | H04L 67/10 709/225 |
| 2013/0114465 A1* | 5/2013 | McGovern | ............. | H04L 41/12 370/254 |
| 2013/0132545 A1* | 5/2013 | Schultze | ................ | H04L 41/00 709/223 |
| 2014/0223507 A1* | 8/2014 | Xu | ...................... | H04L 63/0272 726/1 |

FOREIGN PATENT DOCUMENTS

EP 1396993 3/2004
JP 2011-192250 9/2011

OTHER PUBLICATIONS

Extended European Search Report dated Sep. 3, 2014.

* cited by examiner

*Primary Examiner* — Morshed Mehedi
(74) *Attorney, Agent, or Firm* — IPUSA, PLLC

(57) ABSTRACT

An information processing system includes multiple network segments to which one or more information processors are connectable. The network segments includes a first network segment to which at least one first information processor configured to store predetermined information is connected, a second network segment to which at least one second information processor is connected, and a third network segment to which at least one third information processor is connected. The second network segment includes multiple predefined application programming interface (API)s, and the at least one second information processor executes a process corresponding to a called one of the APIs using the predetermined information stored in the at least one first information processor. In response to receiving a request from outside the information processing system, the at least one third information processor controls a process corresponding to the request by calling one of the APIs which corresponds to the request.

7 Claims, 11 Drawing Sheets

FIG.5

| | | COMMUNICATION DESTINATION SEGMENT | | | | | |
|---|---|---|---|---|---|---|---|
| | | INTERNET | APPLICATION | COMMON SERVICE | DATABASE | MANAGEMENT | OPERATION |
| COMMUNI-CATION SOURCE SEGMENT | INTERNET | | HTTP | HTTP (AUTHEN-TICATION ONLY) | | | |
| | APPLICATION | | HTTP | HTTP LOG TRANSFER | HTTP SQL | | |
| | COMMON SERVICE | HTTP (TO EXTERNAL STORAGE) | HTTP | HTTP LOG TRANSFER | HTTP SQL LOG TRANSFER | | HTTP |
| | DATABASE | | | LOG TRANSFER | SQL | | |
| | MANAGEMENT | | HTTP SSH | HTTP SSH | HTTP SSH | | |
| | OPERATION | | HTTP | HTTP | | HTTP SSH | |

FIG.6

| URL PATH | GATEWAY TYPE ||||||
|---|---|---|---|---|---|---|
| | INTERNET GATEWAY | OPERATION GATEWAY | MANAGEMENT GATEWAY | APPLICATION GATEWAY | COMMON SERVICE GATEWAY | DATABASE GATEWAY |
| /home/* | APPLICATION SERVER*1 | APPLICATION SERVER*1 | — | APPLICATION SERVER | — | — |
| /dscan/* | DOMAIN-SPECIFIC SERVER*1 | DOMAIN-SPECIFIC SERVER*1 | — | DOMAIN-SPECIFIC SERVER | — | — |
| /dprint/* | DOMAIN-SPECIFIC SERVER*1 | DOMAIN-SPECIFIC SERVER*1 | — | DOMAIN-SPECIFIC SERVER | — | — |
| /login/* | MANAGEMENT SERVER (AUTHEN-TICATION PART)*1 | MANAGEMENT SERVER (AUTHEN-TICATION PART)*1 | MANAGEMENT SERVER (AUTHEN-TICATION PART)*2 | — | MANAGEMENT SERVER (AUTHEN-TICATION PART) | — |
| /jobqueue/* | — | — | — | — | QUEUE SERVER | — |
| /tmpfile/* | — | — | — | — | — | TEMPORARY IMAGE STORAGE SERVER |
| /license/* | — | — | MANAGEMENT SERVER (LICENSE MANAGEMENT PART) | — | MANAGEMENT SERVER (AUTHEN-TICATION PART) | — |
| /logbrowser/* | — | LOG COLLECTION SERVER*1 | — | — | — | — |

INFORMATION PROCESSING SYSTEM

CROSS-REFERENCE TO RELATED APPLICATIONS

The present application is a continuation of U.S. patent application Ser. No. 14/171,923, filed on Feb. 4, 2014, which is based upon and claims the benefit of priority of Japanese Patent Applications No. 2013-021574, filed on Feb. 6, 2013, and No. 2014-008663, filed on Jan. 21, 2014. The disclosures of the prior applications are hereby incorporated herein in their entirety by reference.

BACKGROUND OF THE INVENTION

1. Field of the Invention

The present invention relates to information processing systems.

2. Description of the Related Art

Recently, it has been becoming popular to provide services using software provided on a network such as the Internet without execution of application programs in information processors directly operated by users. Cloud services are known as such form of providing services.

Reference may be made to, for example, Japanese Laid-Open Patent Application No. 2011-192250 for related art.

SUMMARY OF THE INVENTION

According to an aspect of the present invention, an information processing system includes multiple network segments to which one or more information processors are connectable. The network segments includes a first network segment to which at least one first information processor configured to store predetermined information is connected, a second network segment to which at least one second information processor is connected, and a third network segment to which at least one third information processor is connected. The second network segment includes multiple predefined application programming interface (API)s, and the at least one second information processor executes a process corresponding to a called one of the APIs using the predetermined information stored in the at least one first information processor. In response to receiving a request from outside the information processing system, the at least one third information processor controls a process corresponding to the request by calling one of the APIs which corresponds to the request.

According to an aspect of the present invention, an information processing system includes multiple information processors, which includes at least one first information processor connected to a first network segment, at least one second information processor connected to a second network segment, and at least one third information processor connected to a third network segment. The at least one first information processor stores predetermined information. The at least one second information processor includes multiple predefined application programming interface (API)s and executes a process corresponding to a called one of the APIs using the predetermined information stored in the at least one first information processor. In response to receiving a request from outside the information processing system, the at least one third information processor controls a process corresponding to the request by calling one of the APIs which corresponds to the request.

The object and advantages of the invention will be realized and attained by means of the elements and combinations particularly pointed out in the claims.

It is to be understood that both the foregoing general description and the following detailed description are exemplary and explanatory and not restrictive of the invention.

BRIEF DESCRIPTION OF THE DRAWINGS

Other objects, features and advantages of the present invention will become more apparent from the following detailed description when read in conjunction with the accompanying drawings, in which:

FIG. 5 is a diagram illustrating communications allowed by a firewall;

FIG. 6 is a diagram for illustrating control of communications by each gateway;

DETAILED DESCRIPTION OF THE PREFERRED EMBODIMENTS

There may be a chance of providing further additional values to apparatus users if services concerning apparatuses such as image forming apparatuses as well may be provided as services provided through a network as typified by cloud services.

According to an aspect of the present invention, an information processing system capable of providing services that cooperate with apparatuses is provided.

Figure 1:
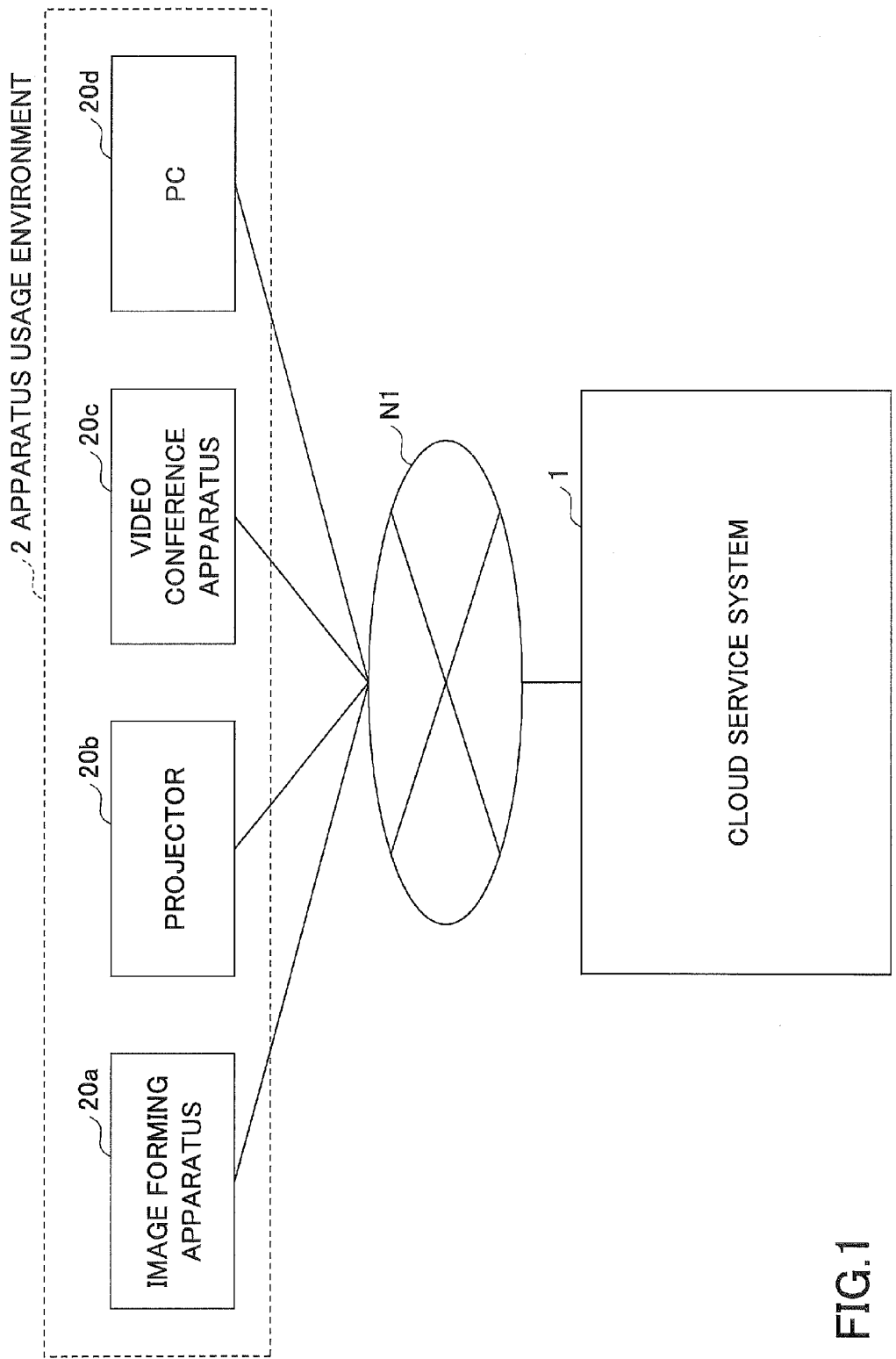
FIG. 1 is a diagram for illustrating the relationship between a cloud service system and apparatuses according to an embodiment of the present invention.

A description is given below, with reference to the accompanying drawings, of embodiments of the present invention. FIG. 1 is a diagram for illustrating the relationship between a cloud service system and apparatuses according to an embodiment of the present invention. Referring to FIG. 1, a cloud service system 1 and apparatuses in an apparatus usage environment 2 are connected by a network N1 such as a wide area network (WAN) typified by the Internet, so as to be able to communicate with each other.

The apparatus usage environment 2 is an environment where apparatuses capable of cooperating with services provided by the cloud service system 1 are used. Examples of the apparatus usage environment 2 include an office or the like in an enterprise. Referring to FIG. 1, the apparatus usage environment 2 includes an image forming apparatus 20a, a projector 20b, a video conference apparatus 20c, and a personal computer (PC) 20d as examples of apparatuses. Hereinafter, the image forming apparatus 20a, the projector 20b, the video conference apparatus 20c, and the PC 20d may be collectively referred to as "apparatuses 20."

The image forming apparatus 20a is, for example, a multifunction machine, a printer, a scanner, a facsimile machine or the like. The projector 20b is an apparatus that projects image data. The video conference apparatus 20c is an apparatus used in a video conference. Embodiments of the present invention may also be applied to apparatuses other than the apparatuses 20 illustrated in FIG. 1.

The PC 20d is a common PC.

The cloud service system 1 is a group of one or more computers (information processors) that provide various kinds of services with which the apparatuses 20 are capable of cooperating (hereinafter referred to as "apparatus cooperation services") as cloud services. Examples of apparatus cooperation services include the service of storing image data scanned by and transferred from the image forming apparatus 20a in a predetermined storage (hereinafter referred to as "cloud scan service") and the service of causing the image forming apparatus 20a to download print data uploaded in advance to the cloud service system 1 and to execute a print job based on the print data (hereinafter referred to as "cloud print service").

The apparatus cooperation services may not be necessarily provided as cloud services. For example, the cloud service system 1 may be a server-side system in a common client/server system. Furthermore, the network N1 may be a local area network (LAN).

Figure 2:
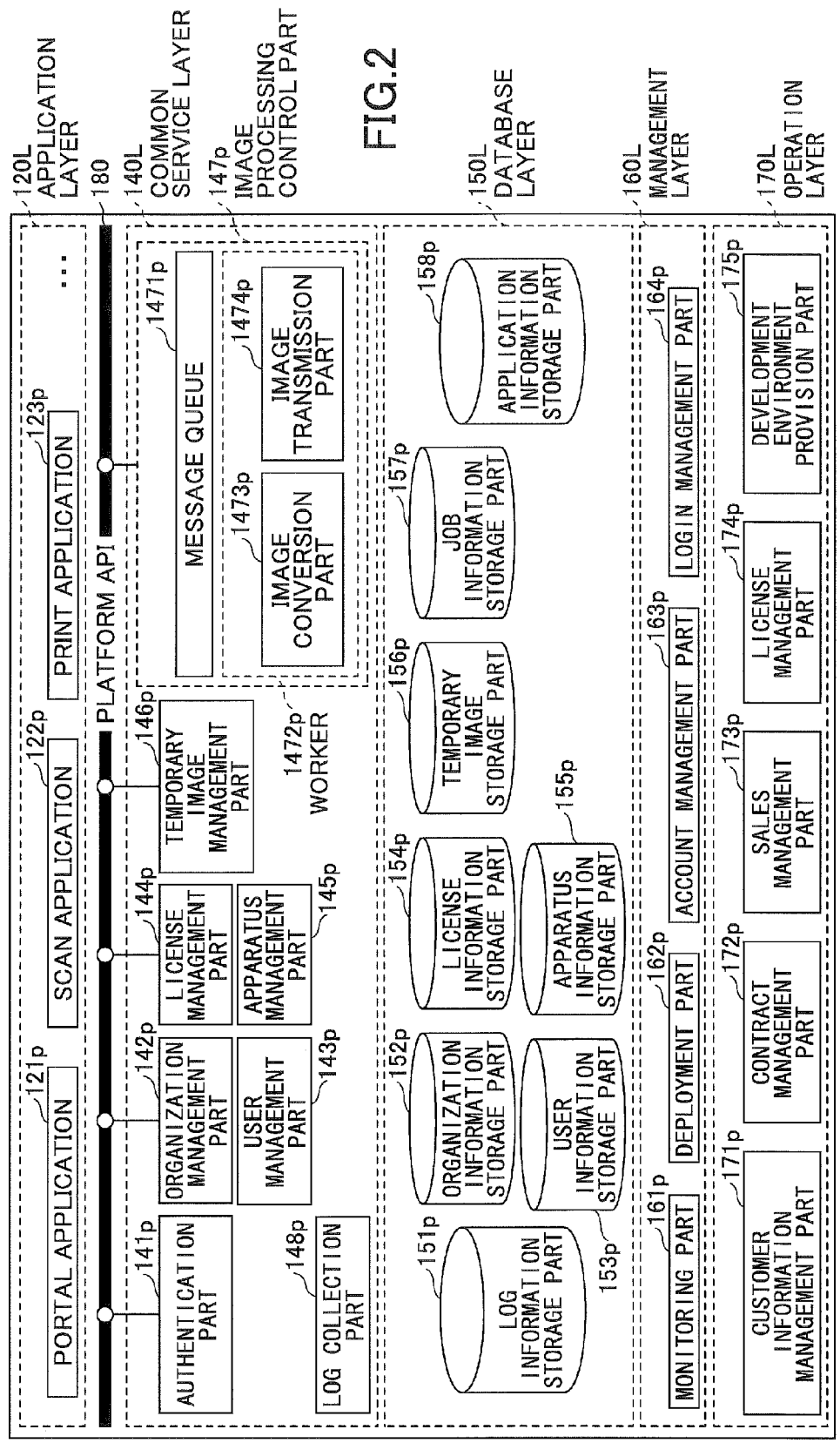
FIG. 2 is a diagram illustrating a first functional configuration of a cloud service system according to an embodiment of the present invention.

FIG. 2 is a diagram illustrating a first functional configuration of a cloud service system according to an embodiment of the present invention.

The functions of the cloud service system 1 are classified into five layers, which are an application layer 120L, a common service layer 140L, a database layer 150L, a management layer 160L, and an operation layer 170L. Of these, the three layers of the application layer 120L, the common service layer 140L, and the database layer 150L are directly related to the provision of apparatus cooperation services. On the other hand, the management layer 160L and the operation layer 170L are layers related mainly to the maintenance, management, development or the like of the cloud service system 1.

The application layer 120L is a layer in which server-side applications (hereinafter referred to as "server applications") related to apparatus cooperation services are implemented. Referring to FIG. 2, the application layer 120L includes a portal application 121p, a scan application 122p, and a print application 123p. The portal application 121p is a server application that provides the portal sites of apparatus cooperation services. In the portal sites, it is possible to register user information and set configuration information with respect to server applications user by user. The scan application 122p is a server application that executes a server-side process with respect to the above-described cloud scan service. The print application 123p is a server application that executes a server-side process with respect to the above-described cloud print service.

The common service layer 140L is a layer that includes functions common to multiple server applications or basic functions used by multiple server applications. The functions of the common service layer 140L may be called through a predefined platform application programming interface (API) 180. The platform API 180 is basically called from a server application in the application layer 120L. The platform API 180 may be made open to a third-party vendor different from the operator of the cloud service system 1. In this case, server applications may be implemented by the third-party vendor. That is, server applications are suitably developed and added using the platform API 180.

Referring to FIG. 2, the common service layer 140L includes an authentication part 141p, an organization management part 142p, a user management part 143p, a license management part 144p, an apparatus management part 145p, a temporary image management part 146p, an image processing control part 147p, and a log collection part 148p.

The authentication part 141p performs authentication and authorization with respect to users and the apparatuses 20 that access the cloud service system 1. The authorization includes determining whether to authorize a user or apparatus 20 to access a service that is an access target. For example, the authorization is performed based on the presence or absence of a license for a service that is a target access.

The organization management part 142p, the user management part 143p, the license management part 144p, the apparatus management part 145p and the temporary image management part 146p provide access to an organization information storage part 152p, a user information storage part 153p, a license information storage part 154p, an apparatus information storage part 155p, and a temporary image storage part 156p, respectively, in the database layer 150L. The access provides an interface for writing information to and reading information from a corresponding storage part.

The image processing control part 147p controls a workflow with respect to the processing of data such as image data. The workflow with respect to image processing refers to a process flow constituted by sequencing one or more processing units whose target of processing is data. The image processing control part 147p includes a message queue 1471p and workers 1472p. The workers 1472p execute processing on data. Referring to FIG. 2, an image conversion part 1473p and an image transmission part 1474p are illustrated as examples of the workers 1472p. The image conversion part 1473p converts data formats and performs optical character recognition (OCR) with respect to data. The image transmission part 1474p transmits image data to an online storage or the like outside the cloud service system 1, for example. Each of the image conversion part 1473p and the image transmission part 1474p, which is indicated by a single rectangle in FIG. 2, may be implemented function by function in different software modules.

The message queue 1471p manages requests for processing (processing requests) to the workers 1472p using a storage area of a queue structure. The message queue 1471p, which is indicated by a single rectangle in FIG. 2, may be provided for each worker 1472p. That is, the message queue 1471p may be provided in correlation with the corresponding worker 1472p. The transmission of processing requests stored in the message queue 1471p to the workers 1472p may be of either a PUSH type or a PULL type. In the PUSH-type transmission, processing requests registered with the message queue 1471p are transmitted to the workers 1472p by the message queue 1471p. In the PULL-type transmission, each worker 1472p polls the message queue 1471p and, if a processing request is included in the message queue 1471p, extracts the processing request. The presence of the message queue 1471p makes it possible for each worker 1472p to execute processing asynchronously with a processing request. As a result, it is possible to reduce the necessity for a requestor of processing to wait for the completion of the processing by the workers 1472p.

The log collection part 148a collects logs related to processes executed in the application layer 120L and the common service layer 140L from each part and stores the collected logs in a log information storage part 151p in the database layer 150L. The form of collecting logs may also be either a PUSH type or PULL type.

The database layer 150L is a layer including a database that stores various kinds of information. Referring to FIG. 2, the database layer 150L includes the log information storage part 151p, the organization information storage part 152p, the user information storage part 153p, the license information storage part 154p, the apparatus information storage part 155p, the temporary image storage part 156p, a job information storage part 157p, and an application information storage part 158p.

The log information storage part 151p stores logs collected by the log collection part 148a. The organization information storage part 152p stores the attribute information of each of organizations of the cloud service system 1 (hereinafter referred to as "organization information"). The term "organization" refers to a group of one or more users, of which examples include enterprises or other associations. The organization information includes an organization ID for identifying the organization. The user information storage part 153p stores the attribute information of each user belonging to the organization (hereinafter referred to as "user information"). The user information includes a user ID for identifying the user and a password used for authenticating the user. The user information includes the organization ID of an organization to which the user belongs as well. This is because it is satisfactory if the uniqueness of the user ID is guaranteed within the organization. That is, in this embodiment, each user is identified by the combination of an organization ID and a user ID.

The license information storage part 154p stores, with respect to each organization, information on a license possessed by the organization. The license is a license for an apparatus cooperation service. The apparatus cooperation service is basically in one-to-one correspondence with a server application. Accordingly, the license for an apparatus cooperation service may also be a license for a server application.

The apparatus information storage part 155p stores the attribute information of an apparatus 20 used in an organization (hereinafter referred to as "apparatus information"). The apparatus information includes, for example, identification information for identifying the machine body (individual body) of each apparatus 20.

The temporary image storage part 156p stores a temporary image. The temporary image is data temporarily generated by processing by the workers 1472p. Although the term "image" is used for convenience purposes, the temporary image does not necessarily have to be image data. For example, the temporary image may be text data. The job information storage part 157p stores information related to processing by the workers 1472p. The application information storage part 158p stores, with respect to each organization or user, configuration information with respect to a server application available to the organization or user.

Basically, the server application may access each storage part of the database layer 150L through a corresponding management part in the common service layer 140L. The application information storage part 158a, however, may be directly accessed by each server application.

The management layer 160L is a layer where functions for maintaining and managing the cloud service system 1 are implemented. Referring to FIG. 2, the management layer 160L includes a monitoring part 161p, a deployment part 162p, an account management part 163p, and a login management part 164p.

The monitoring part 161p monitors the operations of the application layer 120L, the common service layer 140L, and the database layer 150L (which are hereinafter referred to as "upper three layers"), and detects the occurrence of an abnormality. The deployment part 162p performs software deployment (installation, upgrading, etc.) for the upper three layers. The account management part 163p manages the account of a manager who may log into each of the below-described servers of the upper three layers. The manager refers to a user in an organization that operates the cloud service system 1, and is a term for making a distinction from a user in the apparatus usage environment 2.

The login management part 164p operates as a platform for logging into the above-mentioned servers by the manager. That is, the manager may log into each server via the login management part 164p.

The operation layer 170L is a layer where functions for operations carried out by the cloud service system 1 are implemented. Referring to FIG. 2, the operation layer 170L includes a customer information management part 171p, a contract management part 172p, a sales management part 173p, a license management part 174p, and a development environment provision part 175p.

The customer information management part 171p manages information on customers. The customers are basically organizations. The contract management part 172p manages information on contracts made with customers in their usage of apparatus cooperation services. The sales management part 173p manages information on the sales of apparatus cooperation services. The license management part 174p manages, with respect to each customer, information on a license possessed by the customer. The license management part 174p in the operation layer 170L registers information to be set on the operator side and updates the registered information. The information to be set on the operator side includes, for example, license registration and deletion information. On the other hand, the license management part 144p in the common service layer 140L registers information to be set on the user side and updates the registered information. The information to be set on the user side includes information on, for example, the start of use of a license and the end of use of a license.

The development environment provision part 175p provides a developer with a development environment of software with respect to the upper three layers. The developer is, for example, a developer in an enterprise that operates the cloud service system 1. The development environment provided by the development environment provision part 175p may be made open to software vendors outside the enterprise.

Figure 3:
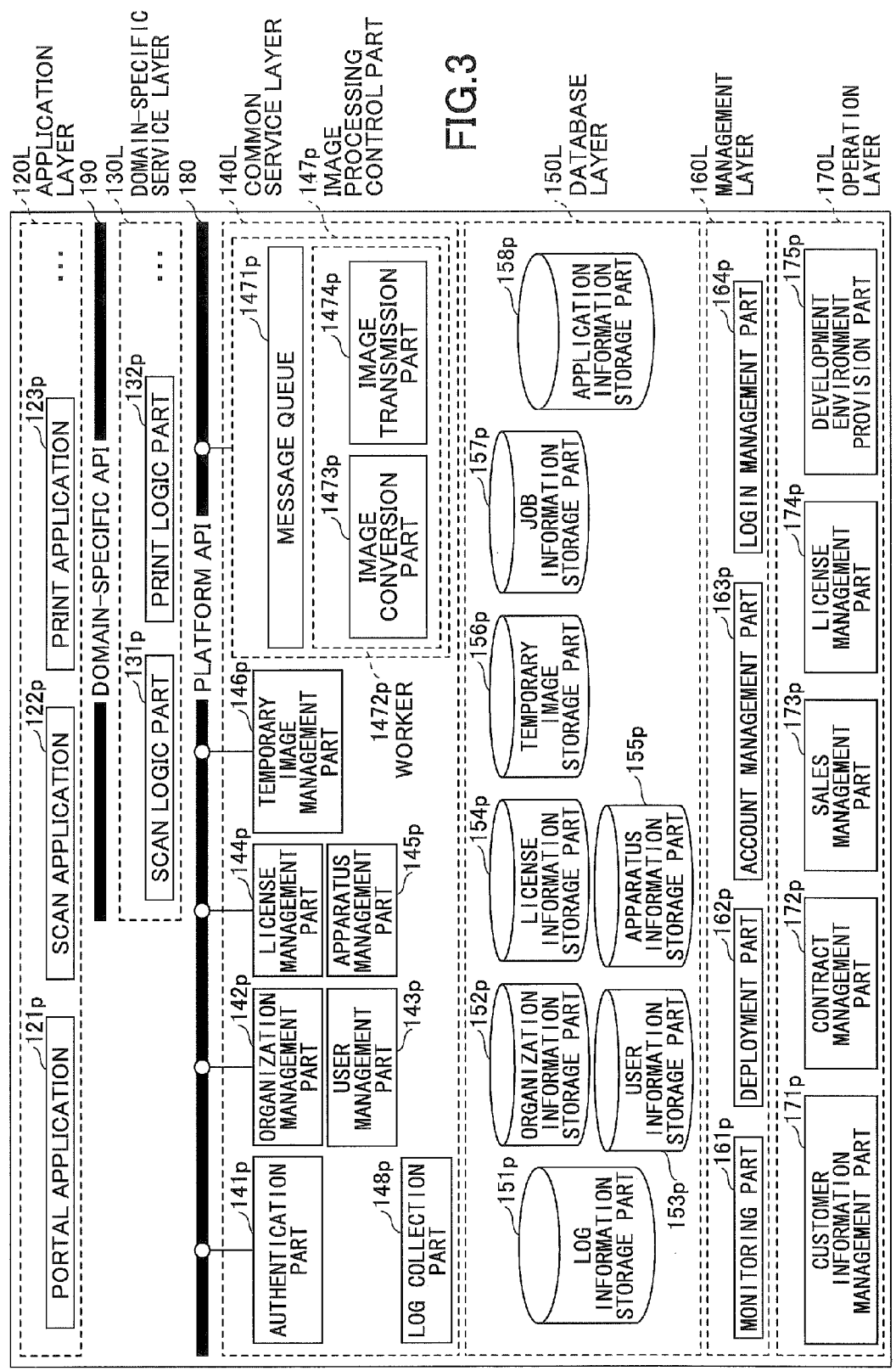
FIG. 3 is a diagram illustrating a second functional configuration of a cloud service system according to an embodiment of the present invention.

The functional configuration of the cloud service system 1 may be implemented as illustrated in FIG. 3. FIG. 3 is a diagram illustrating a second functional configuration of a cloud service system according to an embodiment of the present invention. In FIG. 3, the same elements as those of FIG. 2 are referred to by the same reference characters, and their description is omitted.

Referring to FIG. 3, a domain-specific service layer 130L is provided between the application layer 120L and the common service layer 140L. The domain-specific service layer 130L is a layer that provides services of higher completeness, coarser granularity, or higher applicability than the common service layer 140L. The services provided by the domain-specific service layer 130L are available through a domain-specific API 190. The domain-specific API 190 is an API of coarser granularity than the platform API 180. The domain-specific API 190 may also be made open to the outside.

Referring to FIG. 3, the common service layer 140L includes a scan logic part 131*p* and a print logic part 132*p*. The scan logic part 131*p* executes a logic part of the cloud scan service. The logic part of the cloud scan service is the function of the scan application 122*p* except for a user interface (UI) function in the configuration of FIG. 2. The user interface function mainly refers to the function of generating and providing a Web UI (Web page). Accordingly, in the configuration of FIG. 3, the main function of the scan application 122*p* is related to the user interface function as a result of using the scan logic part 131*p*.

The print logic part 132*p* executes a logic part of the cloud print service. The logic part of the cloud print service is the function of the print application 123*p* except for a user interface function in the configuration of FIG. 2. Accordingly, in the configuration of FIG. 3, the main function of the print application 123*p* is related to the user interface function as a result of using the print logic part 132*p*.

The provision of the domain-specific service layer 130L and the provision of the domain-specific API 190 make it possible to reduce the amount of source codes to be implemented when other cloud services or the like cooperate with apparatus cooperation services, for example. That is, a single function or method (hereinafter collectively referred to as "method") of the domain-specific API 190 provides a function close to a server application by calling multiple methods of the platform API 180. Accordingly, the domain-specific API 190 is effective in such a case where early cooperation with a service is desired although the service is ready-made. Furthermore, a server application having multiple functions may be implemented using the domain-specific API 190.

On the other hand, in the case where it is desired to implement a unique server application, it is preferable to use the platform API 180.

In the following description, the second functional configuration illustrated in FIG. 3 is employed.

Figure 4:
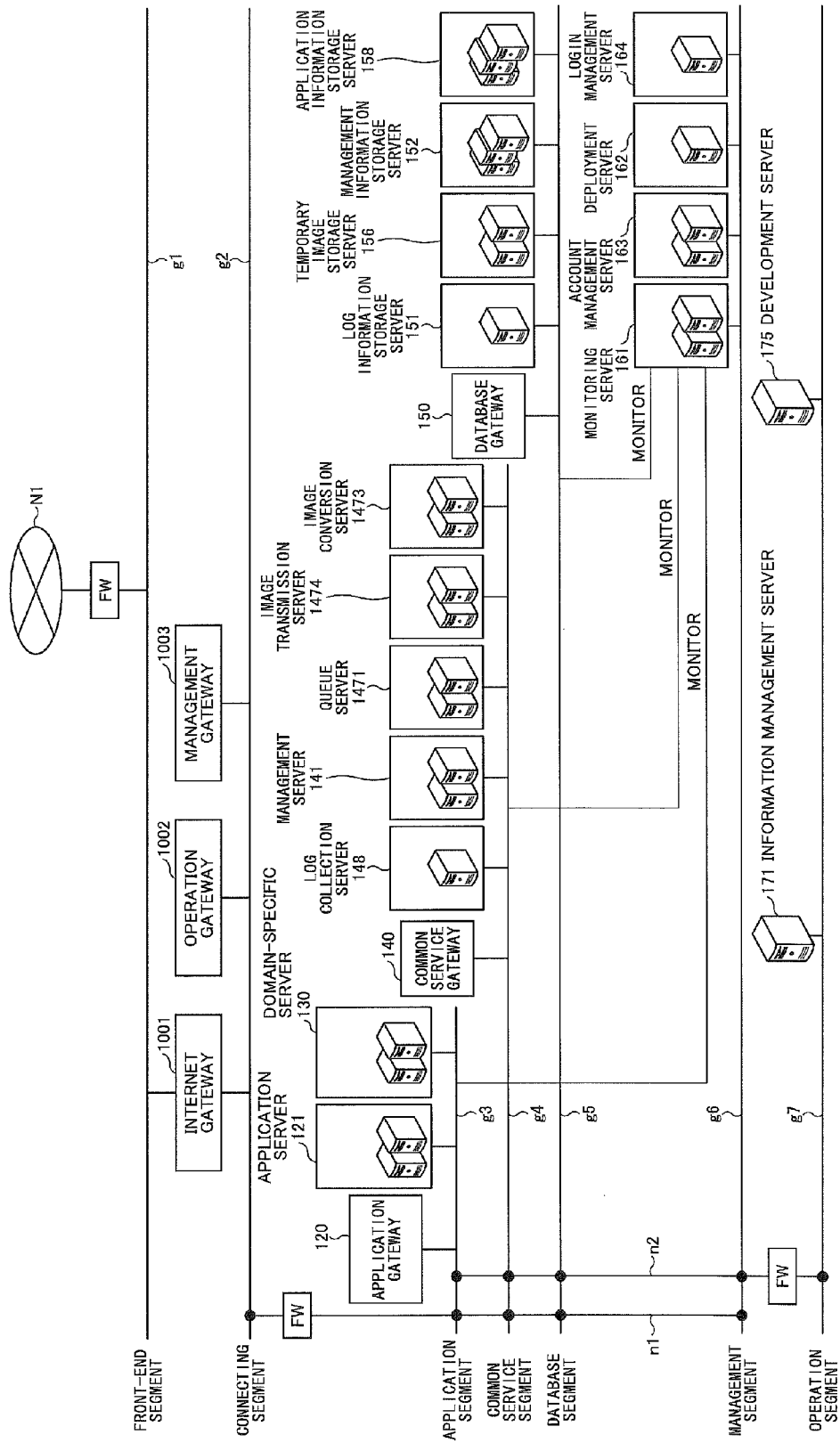
FIG. 4 is a diagram illustrating a network configuration of a cloud service system according to an embodiment of the present invention.

FIG. 4 is a diagram illustrating a network configuration of a cloud service system according to an embodiment of the present invention. Referring to FIG. 4, the cloud service system 1 includes a network divided into seven network segments (subnets), which are a front-end segment g1, a connecting segment g2, an application segment g3, a common service segment g4, a database segment g5, a management segment g6, and an operation segment g7. The term "network segment" refers to a unit of a network where IP addresses have a common network address. Each network segment may be further divided into network segments of a smaller unit. Hereinafter, the network segment is simply referred to as "segment." Furthermore, the front-end segment g1, the connecting segment g2, the application segment g3, the common service segment g4, the database segment g5, the management segment g6, and the operation segment g7 are simply referred to as "segments g" when making no distinction among them. One or more computers may be connected to each of the segments g.

The front-end segment g1 is the forefront segment to the network N1. A firewall FW is provided between the front-end segment g1 and the network N1.

The connecting segment g2 is a segment for connecting the front-end segment g1 to the application segment g3, the common service segment g4, the database segment g5, and the management segment g6 via a firewall FW. Gateways such as an Internet gateway 1001, an operation gateway 1002, and a management gateway 1003 are connected to the connecting segment g2. In this embodiment, gateways are apparatuses that balance a load of processing with respect to an external message and determine whether to allow passage of a message. Firewalls FW also determine whether to allow passage of a message. The difference, however, lies in that while firewalls FW monitor the TCP/IP layers, gateways monitor the HTTP layer, which is a layer higher than the TCP/IP layer. For example, firewalls FW determine whether to allow passage of a packet based on the IP address of at least one of the source and the destination of the packet and a port number. On the other hand, gateways determine whether to allow passage of a message based on, for example, the uniform resource locator (URL) of the destination of the message.

The Internet gateway 1001 is a gateway that processes messages via the network N1. Accordingly, messages via the network N1 are first received by the Internet gateway 1001.

The operation gateway 1002 is a gateway that processes messages from the operation segment g7. The operation segment g7 corresponds to part of the intra-WAN of the operator (operating enterprise) of the cloud service system 1. The other segments g1 through g6 also constitute the intra-WAN. Accordingly, for example, when a developer or the like of software related to the cloud service system 1 tests or uses a server application using a computer connected to the operation segment g7, a message from the computer is received by the operation gateway 1002 via the intra-WAN without going through the network N1.

A description is given below of the management gateway 1003.

The application segment g3 is a segment corresponding to the application layer 120L and the domain-specific service layer 130L in FIG. 3. An application gateway 120, an application server 121, and a domain-specific server 130 are connected to the application segment g3.

The application gateway 120 is a gateway that processes messages to the application segment g3. The application server 121 is a computer that implements the application layer 120L. That is, a server application is implemented in the application server 121. Referring to FIG. 3, two housings are graphically represented with respect to the application server 121. This indicates that the application server 121 has a redundant configuration. The same is the case with other servers. A redundant configuration may also be adopted for a server for which only one housing is graphically represented.

The domain-specific server 130 is a computer that implements the domain-specific service layer 130L. Accordingly, the domain-specific API 190 is provided by the domain-specific server 130. Furthermore, one or more programs that cause a computer to operate as the scan logic part 131*p* and the print logic part 132*p* are installed in the domain-specific server 130.

In the case where a third-party vendor different from the operator of the cloud service system 1 implements a server application, for example, the application segment g3 may be divided into a segment under the management of the operator and a segment available to the third-party vendor.

The common service segment g4 is a segment corresponding to the common service layer 140L. That is, the platform API 180 is provided by a group of computers connected to the common service segment g4. The platform API 180 and the domain-specific API 190 are called via a network. For example, representational state transfer (REST) may be used in implementing an API via a network. Alternatively, the platform API 180 and the domain-specific API 190 may be implemented using other communication protocols.

A common service gateway 140, a log collection server 148, a management server 141, a queue server 1471, an image transmission server 1474, and an image conversion server 1473 are connected to the common service segment g4. The common service gateway 140 is a gateway that processes messages to the common service segment g4. The log collection server 148 is a computer that operates as the log collection part 148p. That is, a program that causes a computer to operate as the log collection part 148p is installed in the log collection server 148. The management server 141 is a computer that operates as the authentication part 141p, the organization management part 142p, the user management part 143p, the apparatus management part 145p, and the license management part 144p. That is, one or more programs that cause a computer to operate as the authentication part 141p, the organization management part 142p, the user management part 143p, the apparatus management part 145p, and the license management part 144p are installed in the management server 141. The parts 141p through 145p implemented by the management server 141 may be implemented by different computers, respectively.

The queue server 1471 is a computer that operates as the message queue 1471p. That is, a program that causes a computer to operate as the message queue 1471p is installed in the queue server 1471. The image transmission server 1474 is a computer that operates as the image transmission part 1474p, which is one of the workers 1472p. That is, a program that causes a computer to operate as the image transmission part 1474p is installed in the image transmission server 1474. The image conversion server 1473 is a computer that operates as the image conversion part 1473p, which is one of the workers 1472p. That is, a program that causes a computer to operate as the image conversion part 1473p is installed in the image conversion server 1473.

The queue server 1471, the image transmission server 1474, and the image conversion server 1473 constitute the image processing control part 147p.

The database segment g5 is a segment corresponding to the database layer 150L of FIG. 3. A database gateway 150, a log information storage server 151, a temporary image storage server 156, a management information storage server 152, and an application information storage server 158 are connected to the database segment g5.

The database gateway 150 is a gateway that processes messages to the database segment g5. The log information storage server 151 is a computer that operates as the log information storage part 151p. The temporary image storage server 156 is a computer that operates as the temporary image management part 146p and the temporary image storage part 156p. The management information storage server 152 is a computer that operates as the organization information storage part 152p, the user information storage part 153p, the license information storage part 154p, the apparatus information storage part 155p, and the job information storage part 157p. The application information storage server 158 is a computer that operates as the application information storage part 158p. In the computers in the database segment g5, programs (for example, database management system (DBMS)s) that cause the computers to operate as the corresponding storage parts are installed.

The management segment g6 is a segment corresponding to the management layer 160L. A monitoring server 161, an account management server 163, a deployment server 162, and a login management server 164 are connected to the management segment g6.

The monitoring server 161 is a computer that operates as the monitoring part 161p. That is, a program that causes a computer to operate as the monitoring part 161p is installed in the monitoring server 161. The account management server 163 is a computer that operates as the account management part 163. That is, a program that causes a computer to operate as the account management part 163p is installed in the account management server 163. The deployment server 162 is a computer that operates as the deployment part 162p. That is, a program that causes a computer to operate as the deployment part 162p is installed in the deployment server 162. The login management server 164 is a computer that operates as the login management part 164p. That is, a program that causes a computer to operate as the login management part 164p is installed in the login management server 164.

The operation segment g7 is a segment corresponding to the operation layer 170L of FIG. 3. An information management server 171 and a development server 175 are connected to the operation segment g7. The information management server 171 is a computer that operates as the customer information management part 171p, the contract management part 172p, the sales management part 173p, and the license management part 174p. That is, one or more programs that cause a computer to operate as these parts 171p through 174p are installed in the information management server 171. The development server 175 is a computer that operates as the development environment provision part 175p. That is, a program that causes a computer to operate as the development environment provision part 175p is installed in the development server 175.

The license management part 174p in the information management server 171 copies license information stored in the information management server 171 to the license management part 144p in the management server 141 of the common service segment g4. A message for this copy is transmitted to the license management part 144p via the management gateway 1003. That is, the management gateway 1003 is used for the license management part 174p to copy license information to the license management part 144p. The license information is information of extremely high confidentiality. Therefore, the management gateway 1003 that restricts messages with higher security is used in copying the license information.

Furthermore, in FIG. 4, a network group n1, which starts at the connecting segment g2 and ends at the management segment g6, is a network group that is used to transmit messages received in the gateways 1001 through 1003 in the connecting segment g2, perform communications according to the messages, and perform communications for the monitoring of servers by the monitoring server 161. The network group n1 is a group of networks each connecting corresponding two of the segments between the connecting segment g2 and the management segment g6. That is, the segments are connected by independent networks each connecting corresponding two of the segments. A firewall FW (not graphically represented) is provided in each of the inter-segment networks. Accordingly, high security is ensured for inter-segment communications as well.

The network group n1 does not reach the operation segment g7 in order to prevent access to the operation segment g7 (intra-WAN) from outside the intra-WAN of the operator of the cloud service system 1.

Furthermore, a network group n2, which starts at the operation segment g7 and ends at the application segment g3, is a network group used to access the segments from the operation segment g7 for operation purposes. The network group n2 is a group of networks each connecting corresponding two of the segments between the operation segment g7 and the application segment g3. A firewall FW (not graphically represented) is provided in each of the inter-segment networks.

As illustrated in FIG. 4, the network of the cloud service system 1 is divided into segments corresponding to the layers in the functional configuration of FIG. 3. The layers are classified by functional or obligational commonality. Furthermore, the calling relationship between parts over layers has commonality layer by layer. Accordingly, with respect to firewalls FW, whether to allow passage of a message may be set not server by server but segment by segment. If there is an exceptional server, settings may be configured with respect to the exceptional server.

For example, FIG. 5 is a diagram illustrating communications allowed by a firewall. FIG. 5 illustrates the contents of an allowed communication (such as a communication protocol or a communication purpose) with respect to each combination of a communication source segment and a communication destination segment. In FIG. 5, "SSH" (Secure Shell) is a communication protocol used for authentication. Furthermore, "INTERNET" corresponds to the network N1 in this embodiment.

According to FIG. 5, communications from the Internet are allowed with respect to the application segment g3 and are not allowed with respect to other segments. Exceptionally, however, communications regarding an authentication request are allowed with respect to the common service segment g4.

Furthermore, communications in the same segment are basically allowed.

Furthermore, communications from the application segment g3 to the common service segment 4 and the database segment g5 are allowed. The communications from the application segment g3 to the common service segment g4 include calling the platform API 180 and transferring a log to the log collection server 148. The communications from the application segment g3 to the database segment g5 are mainly communications for accessing the application information storage server 158.

Furthermore, communications from the common service segment g4 to the Internet, the application segment g3, and the database segment g5 are allowed. As described below, the communications from the common service segment g4 to the Internet are required in the case of storing image data in an external storage such as a storage service. The communications from the common service segment g4 to the application segment g3 are mainly communications for transmitting a response to a processing request registered with the queue server 1471. That is, because the response is made asynchronously with the processing request (is called back), the communications from the common service segment g4 to the application segment g3 need to be allowed. The communications from the common service segment g4 to the database segment g5 are communications for accessing the storage parts in the database layer 150L from the common service layer 140L.

Communications for transferring logs from the database segment g5 to the common service segment g4 are allowed.

Communications from the management segment g6 to the application segment g3, the common service segment g4, and the database segment g5 are allowed.

Communications from the operation segment g7 to the application segment g3, the common service segment g4, and the management segment g6 are allowed.

Basically, communications from any segment to the operation segment g7 are prevented. Exceptionally, however, communications from the license management part 144p in the management server 141 of the common service segment g4 to the license management part 174p of the information management server 171 of the operation segment g7 are allowed.

Furthermore, FIG. 6 is a diagram for illustrating control of communications by each gateway. FIG. 6 illustrates, with respect to each URL path, a destination to which each gateway transfers, when receiving a message related to a URL including the path, the received message. In FIG. 6, "- (hyphen)" indicates that passage of a message related to the corresponding URL is prevented. Furthermore, "*1" indicates that in addition to HTTP communications, an HTTPS (HTTP over SSL/TLS) communication is received and an SSL server certificate is returned. Furthermore, "*2" indicates that an HTTPS communication is received and an SSL client certificate is returned. In FIG. 6, some URL paths are omitted. For example, "/home/*" indicates "/home" and other URLs that start with "/home". The same applies to other URLs.

For example, messages having a URL path "/home/*" may be received by the Internet gateway 1001, the operation gateway 1002, and the application gateway 120. These gateways 1001, 1002, and 120 transfer the messages to the application server 121. The messages basically relate to requests to obtain a Web UI (Web page).

Messages having a URL path "/dscan/*" or "/dprint/*" may be received by the Internet gateway 1001, the operation gateway 1002, and the application gateway 120. These gateways 1001, 1002, and 120 transfer the messages to the domain-specific server 130. Specifically, "/dscan/*" corresponds to the scan logic part 131p and "/dprint/*" corresponds to the print logic part 132p.

Messages having a URL path "/login/*" may be received by the Internet gateway 1001, the operation gateway 1002, the management gateway 1003, and the common service gateway 140. These gateways 1001, 1002, 1003, and 140 transfer the messages to the authentication part 141p of the management server 141. The messages relate to authentication requests.

Messages having a URL path "/jobqueue/*" may be received by the common service gateway 140. The common service gateway 140 transfers the messages to the queue server 1471.

Messages having a URL path "/tmpfile/*" may be received by the database gateway 150. The database gateway 150 transfers the messages to the temporary image storage server 156.

Messages having a URL path "/license/*" may be received by the management gateway 1003. The management gateway 1003 transfers the messages to the authentication part 141p of the management server 141. The messages relate to requests to copy license information from the license management part 174p of the information management server 171.

Messages having a URL path "/logbrowser/*" may be received by the operation gateway 1002. The operation gateway 1002 transfers the messages to the log collection server 148. The messages relate to requests to obtain a log at the time of viewing logs. The viewing of logs is authorized in the operation layer 170L. That is, users of the apparatus usage environment 2 are not authorized to view logs. Accordingly, the Internet gateway 1001 is prevented (inhibited) from receiving these messages.

Referring back to FIG. 4, to each of the segments g3 through g7, computers corresponding to the functional parts in a layer (in FIG. 3) corresponding to the segment are connected. By thus installing computers unit by unit with respect to the units classified by functional commonality, it is possible to flexibly address unbalanced loads on functions. That is, the frequency of use and the load may differ from function to function. When loads on functions are not balanced, it is possible to easily level loads on servers by adding one or more computers corresponding to a functional part whose frequency of use or load is high. Specifically, for example, if a load on an image processing server is extremely high so that processing by the image processing server has become a bottleneck, it is possible to reduce the load by adding a computer to the computer(s) of the image processing server.

In view of facilitating the addition of a computer (scaling out), the computers, gateways, and firewalls FW illustrated in FIG. 4 may be implemented by virtual machines. In this case, each segment also is virtualized.

Furthermore, according to this embodiment, a segment that requires higher security is located at a position more distant from the network N1 such as the Internet. Specifically, the database segment g5, which corresponds to the database layer 150L in which information specific to users and should not be leaked, such as log information, organization information, user information, license information, apparatus information, and temporary images, is stored, is located deeper than the application segment g3 and the common service segment g4. As a result, it is possible to ensure high security with respect to the above-described information.

Figure 7:
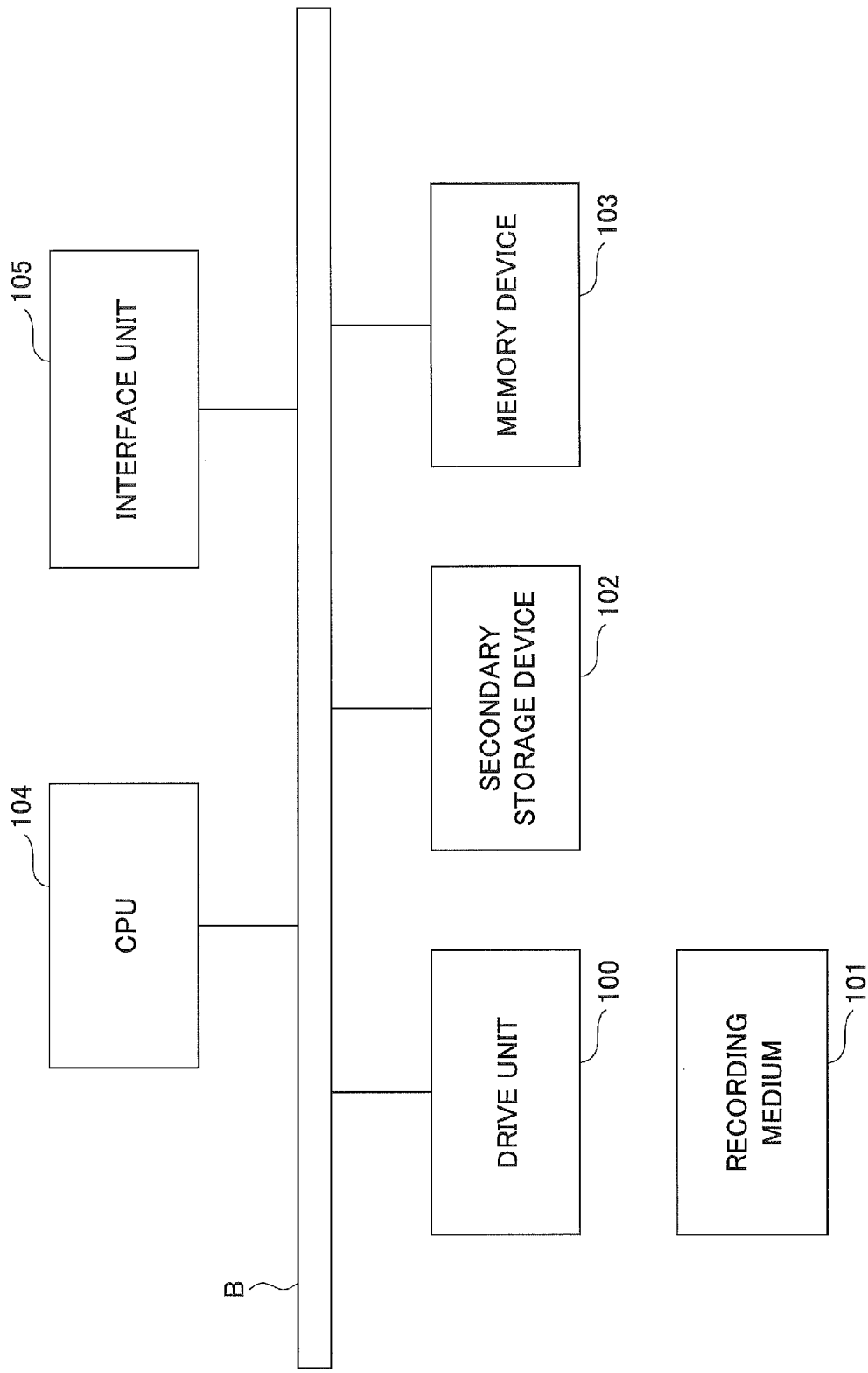
FIG. 7 is a diagram illustrating a hardware configuration of each of computers of a cloud service system according to an embodiment of the present invention.

Next, a description is given of hardware configurations of computers. FIG. 7 is a diagram illustrating a hardware configuration of each of computers of a cloud service system according to an embodiment of the present invention. Each computer includes a drive unit 100, a secondary storage device 102, a memory device 103, a central processing unit (CPU) 104, and an interface unit 105, all of which are interconnected by a bus B.

A program that implements processing in each computer is provided by a recording medium 101 such as a CD-ROM. When the recording medium 101 containing a program is loaded into the drive unit 100, the program is installed into the secondary storage device 102 from the recording medium 101 via the drive unit 100. The program, however, does not necessarily have to be installed from the recording medium 101, and may be downloaded from another computer via a network. The secondary storage device 102 stores the installed program and stores files and data.

The memory device 103 reads a program from the secondary storage device 102 and stores the program in response to a command to activate the program. The CPU 104 executes functions pertaining to the computer in accordance with the program stored in the memory device 103. The interface unit 105 is used as an interface for connecting to a network.

Figure 8:
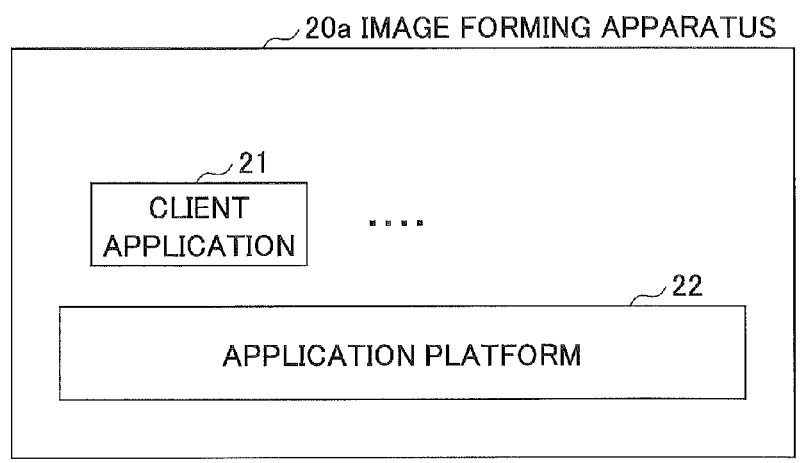
FIG. 8 is a diagram illustrating a software configuration of an image forming apparatus according to an embodiment of the present invention.

On the other hand, the image forming apparatus 20a (FIG. 1) has, for example, the software configuration as illustrated in FIG. 8. FIG. 8 is a diagram illustrating a software configuration of an image forming apparatus according to an embodiment of the present invention. Referring to FIG. 8, the image forming apparatus 20a includes one or more client applications 21 (hereinafter collectively referred to as "client application 21") and an application platform 22.

The client application 21 is an application that provides an apparatus cooperation service to users using the domain-specific API 190. Basically, the client application 21 implements a UI function (a screen display function) and a control function of the image forming apparatus 20a in the apparatus cooperation service. For example, the client application 21 for the cloud scan service is required to be installed in the image forming apparatus 20a that is caused to cooperate with the cloud scan service.

The application platform 22 includes APIs for controlling the image forming apparatus 20a and provides an environment for executing the client application 21. The form of APIs may be, for example, a function or a class and a method of the class of object-oriented programming. For example, the application platform 22 provides the client application 21 with APIs including an API related to a scan function, an API related to a print function, and an API related to a copy function. The application platform 22 may include a Java (registered trademark) virtual machine (VM). In this case, the client application 21 may be implemented by the Java (registered trademark) language.

The application platform 22 includes a mechanism for causing a server application and the client application 21 to cooperate.

The projector 20b (FIG. 1) and the video conference apparatus 20c (FIG. 1) may have the same software configuration as illustrated in FIG. 8. On the other hand, the PC 20d (FIG. 1) may have the same software configuration as illustrated in FIG. 8 or include a general-purpose Web browser.

A description is given below of a process procedure in an apparatus cooperation service provided by the cloud service system 1 illustrated in FIG. 4.

Figure 9:
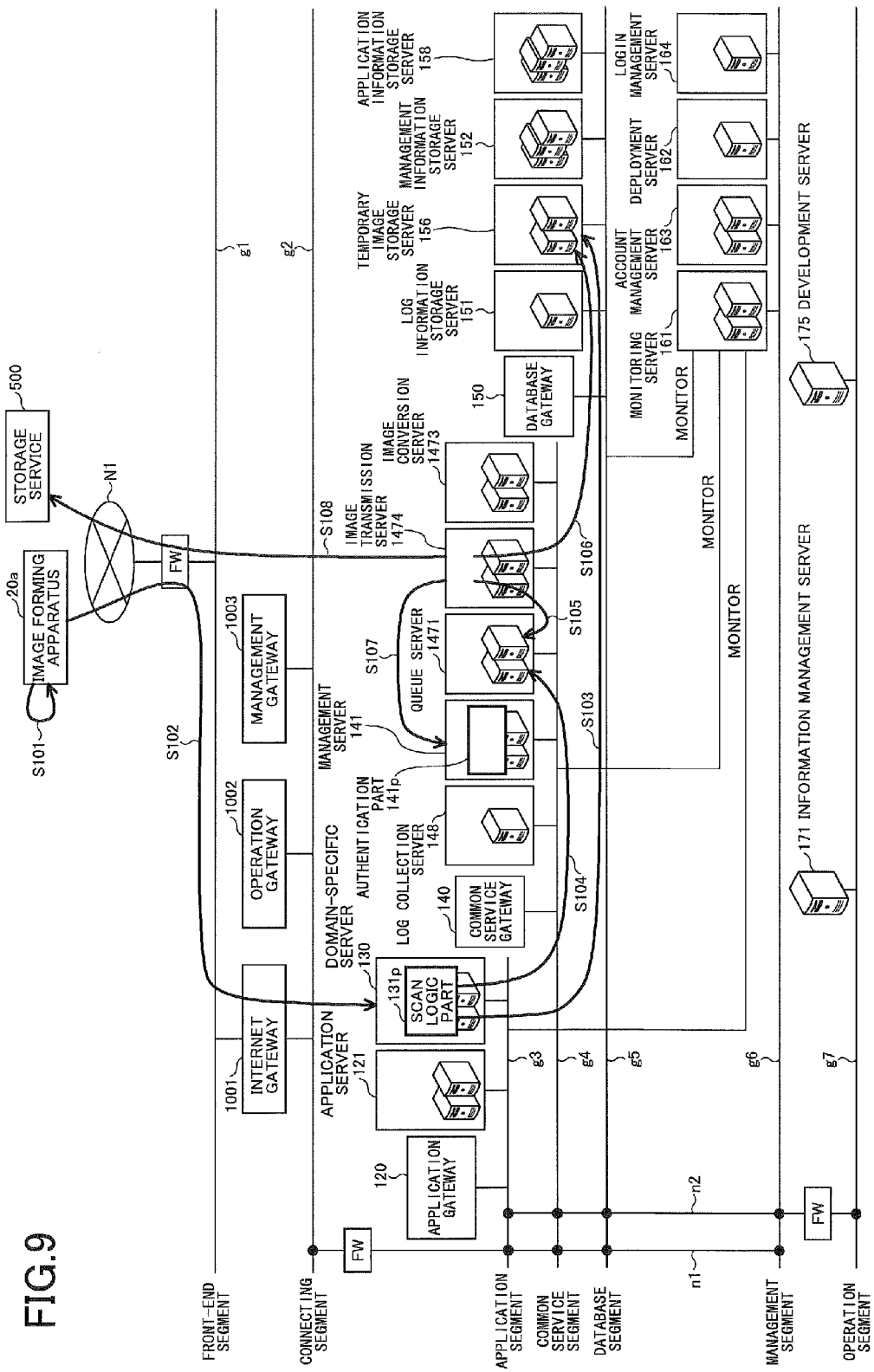
FIG. 9 is a diagram illustrating a process procedure related to a cloud scan service.

FIG. 9 is a diagram illustrating a process procedure related to the cloud scan service. In FIG. 9, it is assumed that the client application 21 corresponding to the cloud scan service is an object of operation in the image forming apparatus 20a. Furthermore, it is assumed that a user's login to the cloud service system 1 from the image forming apparatus 20a is completed. The login is started by, for example, inputting an organization ID, a user ID, and a password (hereinafter collectively referred to as "authentication information") to the operations panel of the image forming apparatus 20a by the user. The application platform 22 transmits a message indicating an authentication request based on the authentication information to the cloud service system 1. A URL pertaining to the message includes "/login/*" as a path. Accordingly, the message is transferred to the authentication part 141p of the management server 141 by the Internet gateway 1001 and the common service gateway 140. In other words, the message is transferred to the authentication part 141p without going through the application segment g3. The authentication request included in the message corresponds to calling the platform API 180. The platform API 180 is basically called from the application layer 120L or the domain-specific service layer 130L. With respect to an API related to authentication requests, however, direct calling from the outside is authorized or allowed.

If the combination of the organization ID, user ID, and password included in the message is stored in the user information storage part 153p of the management information storage server 152, the authentication part 141p of the management server 141 determines that the login has succeeded. Once the logon has succeeded, the authentication part 141p returns a token (for example, a cookie) that indicates that the user has been authenticated. The token is returned to the image forming apparatus 20a via the common service gateway 140 and the Internet gateway 1001. The token is added to the subsequent messages from the image forming apparatus 20a. In this embodiment, the communications between the image forming apparatus 20a and the scan cloud service are performed using HTTPS (HTTP over SSL/TLS).

At step S101, the client application 21 (hereinafter referred to as "scan client application 21a"), which is an object of operation, causes the image forming apparatus 20a to scan an original material in response to the user's operation. Next, at step S102, the scan client application 21a causes the image forming apparatus 20a, via the application platform 22, to transmit a message including a processing request related to image data scanned from the original material. The URL of the message includes "/dscan/*" in its path. Accordingly, the message is transferred to the scan logic part 131p of the domain-specific server 130 by the Internet gateway 1001 and the application gateway 120. That is, the processing request included in the message corresponds to calling the domain-specific API 190.

At step S103, the scan logic part 131p transmits a request to store the image data included in the message to the temporary image storage server 156. As a result, the image data are stored in the temporary image storage server 156p. At step S104, the scan logic part 131p transmits, to the queue server 1471, a request to register the processing request included in the message with the message queue 1471p. For example, if the processing request is a request to store the image data in an external storage service 500, the processing request is registered with the message queue 1471p corresponding to the image transmission part 1474p (the image transmission server 1474). A URL pertaining to the message indicating a request to store the image data from the scan logic part 131p includes "/tmpfile/*" in its path. Accordingly, the message is transferred to the temporary image storage server 156 via the database gateway 150. Furthermore, a URL pertaining to the message indicating a request to register the processing request with the message queue 1471p from the scan logic part 131p includes "/jobqueue/*" in its path. Accordingly, the message is transferred to the queue server 1471 via the common service gateway 140. Thus, a request over segments is transferred via a gateway in the segment of the destination of the request. At this point, the gateway in the segment of the destination of the request determines whether to authorize passage of the request. In the following, a description of going through a gateway is omitted for convenience of description.

Next, at step S105, the image transmission server 1474 obtains the processing request from the message queue 1471p corresponding to the image transmission server 1474 in the queue server 1471. Next, at step S106, the image transmission server 1474 obtains the image data that are determined as an object of processing in the processing request from the temporary image storage server 156. Next, at step S107, because the processing request is a transmission to (storage in) the external storage service 500, the image transmission server 1474 obtains a token for logging into the external storage service 500 from the authentication part 141p in the management server 141. Next, at step S108, the image transmission server 1474 logs into the external storage service 500 using the token, and transmits the image data to (stores the image data in) the external storage service 500.

Figure 10:
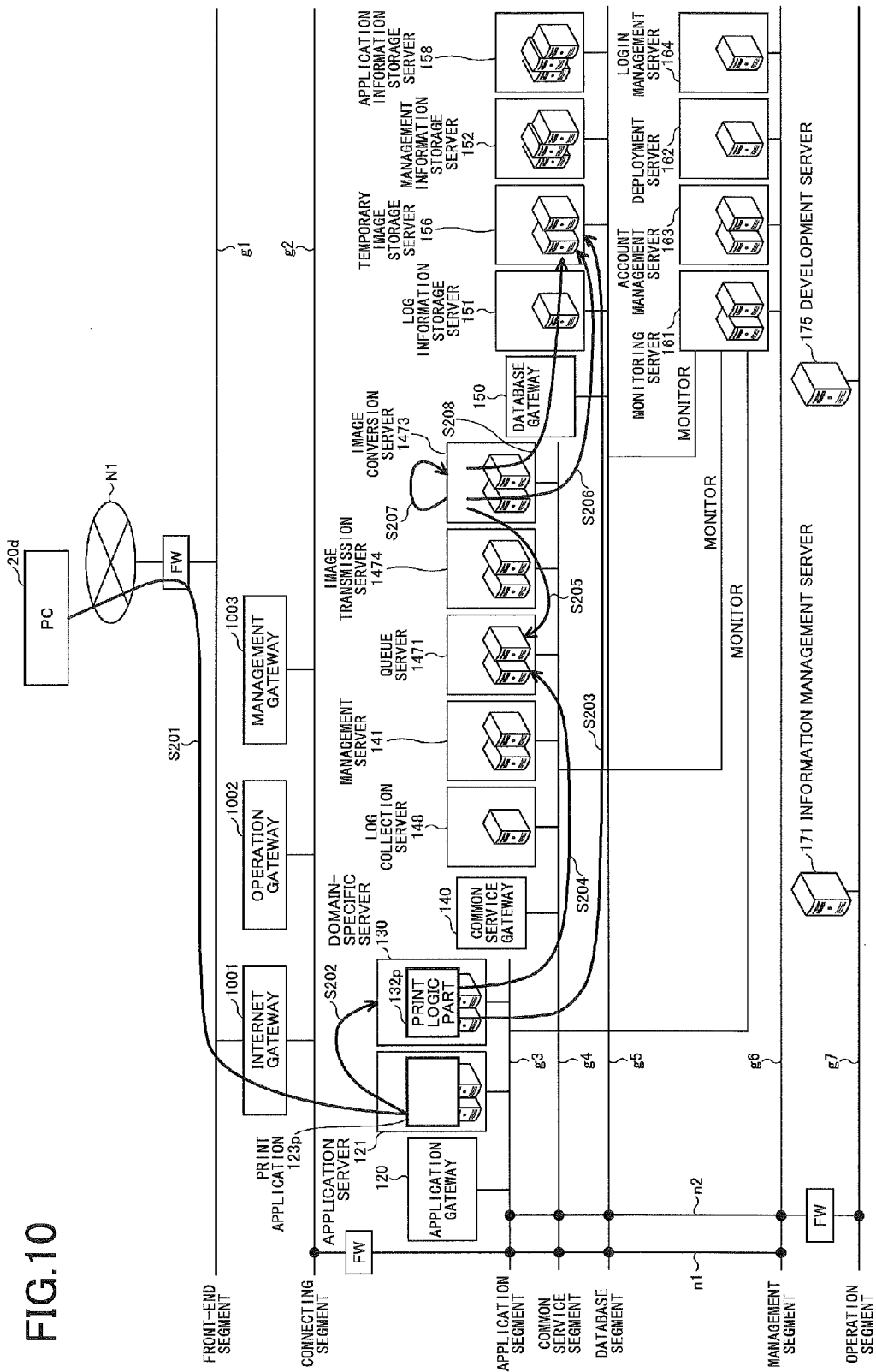
FIG. 10 is a diagram for illustrating a process procedure at the time of registration of print data in a cloud print service.

Next, a description is given of a process procedure of the cloud print service. FIG. 10 is a diagram for illustrating a process procedure at the time of registration of print data in the cloud print service. In FIG. 10, it is assumed that a user's login to the cloud service system 1 from the PC 20d is completed. Furthermore, it is assumed that a print request screen provided by the print application 123p is displayed on a Web browser of the PC 20d. It is possible to specify a file to be printed on the print request screen. Furthermore, with respect to FIG. 10, a portable terminal such as a smartphone or a tablet terminal may be used in place of the PC 20d.

At step S201, when a file to be printed is specified and an instruction to register a request to print the file is input via the print request screen, the PC 20d transmits a message indicating a request to register the print request to the cloud service system 1. The message includes the file to be printed.

The message is transferred to the print application 123p of the application server 121 via the Internet gateway 1001 and the application gateway 120. At step S202, the print application 123p transmits the request to register the print request pertaining to the file included in the message to the print logic part 132p of the domain-specific server 130.

At step S203, the print logic part 132p transmits a request to store the file to the temporary image storage server 156. As a result, the file is stored in the temporary image storage server 156. Furthermore, at step S204, the print logic part 132p transmits, to the queue server 1471, a request to register the print request included in the message with the message queue 1471p. The print request means a request to convert the data included in the file to be printed into print data. Therefore, the print request is registered with the message queue 1471p corresponding to the image conversion part 1473p (the image conversion server 1473).

Next, at step S205, the image conversion server 1473 obtains the print request from the message queue 1471p corresponding to the image conversion server 1473 in the queue server 1471. Next, at step S206, the image conversion server 1473 obtains the file determined as an object of processing in the print request from the temporary image storage server 156. Next, at step S207, the image conversion server 1473 generates print data with respect to the data included in the file based on print settings specified in the print request. Next, at step S208, the image conversion server 1473 transmits a request to store the print data to the temporary image storage server 156. As a result, the print data are stored in the temporary image storage part 156p in correlation with the organization ID and the user ID pertaining to the login user.

Figure 11:
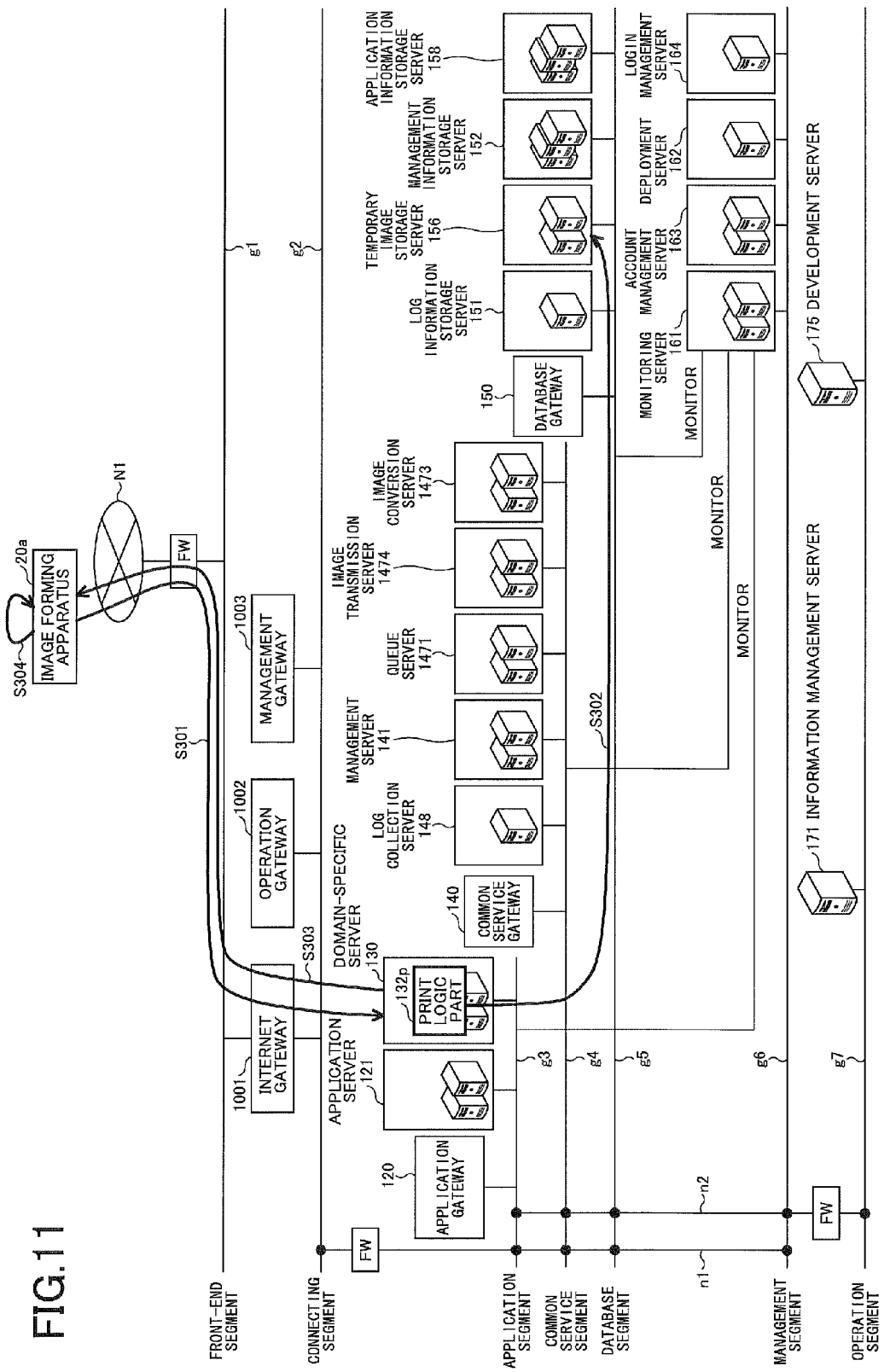
FIG. 11 is a diagram for illustrating a process procedure at the time of printing in the cloud print service.

Next, FIG. 11 is a diagram for illustrating a process procedure at the time of printing in the cloud print service. In FIG. 11, it is assumed that a user's login to the cloud service system 1 from the image forming apparatus 20a is completed. Furthermore, on the operations panel of the image forming apparatus 20a, the bibliographic information of print data pertaining to the login user is displayed in a list on a print data list screen caused to be displayed by the client application 21 (hereinafter referred to as "print client application 21b") corresponding to the cloud print service. The print data list screen is displayed as a result of, for example, the bibliographic information of print data correlated with the organization ID and the user ID of the login user among the print data stored in the temporary image storage server 156 being returned to the print client application 21b in response to a request to the print logic part 132p from the print client application 21b. The bibliographic information of each print data includes the identification information of the print data.

At step S301, when a line including the bibliographic information of one of the print data is selected and a print instruction is input on the print data list screen by the user, the print client application 21b executes a process corresponding to the print instruction. That is, the print client application 21b causes the image forming apparatus 20a, via the application platform 22, to transmit a message indicating a download request including the identification information of the selected print data. The URL of the message includes "/dprint/*" in its path. Accordingly, the message is transferred to the print logic part 132p of the domain-specific server 130 by the Internet gateway 1001 and the application gateway 120.

At step S302, the print logic part 132p obtains the print data included in the message from the temporary image storage server 156. Next, at step S303, the print logic part 132p returns the print data to the image forming apparatus 20a.

At step S304, when the print data are received by the image forming apparatus 20a, the print client application 21b causes the image forming apparatus 20a to execute a print job based on the print data. As a result, paper on which an image represented by the print data is printed is output from the image forming apparatus 20a. The PC 20d in FIG. 10 and the image forming apparatus 20a in FIG. 11 may be operated at locations separated from each other in terms of a network. For example, the PC 20d may be operated at the user's home or a location visited by the user, and the image forming apparatus 20a may be operated at the user's office.

Thus, according to the cloud service system 1 of the embodiments, it is possible to provide services that cooperate with apparatuses.

In the above-described embodiments, the cloud service system 1 is an example of an information processing system. The database segment g5 is an example of a first network segment. The common service segment g4 is an example of a second network segment. The application segment g3 is an example of a third network segment. The management segment g6 is an example of a fourth network segment.

All examples and conditional language provided herein are intended for pedagogical purposes of aiding the reader in understanding the invention and the concepts contributed by the inventors to further the art, and are not to be construed as limitations to such specifically recited examples and conditions, nor does the organization of such examples in the specification relate to a showing of the superiority or inferiority of the invention. Although one or more embodiments of the present invention have been described in detail, it should be understood that the various changes, substitutions, and alterations could be made hereto without departing from the spirit and scope of the invention.

What is claimed is:

1. An information processing system that provides a cloud service, comprising:
    a plurality of information processing apparatuses; and
    a plurality of gateway apparatuses that control passage of communications to the plurality of information processing apparatuses,
    wherein the plurality of information processing apparatuses and the plurality of gateway apparatuses are connected by a first network, the first network being divided into a plurality of network segments corresponding to functional layers of the information processing system classified by functional commonality,
    wherein the plurality of information processing apparatuses includes
        a plurality of first information processing apparatuses connected to a first network segment of the plurality of network segments, wherein the plurality of first information processing apparatuses stores predetermined information;
        a plurality of second information processing apparatuses connected to a second network segment of the plurality of network segments, wherein the plurality of second information processing apparatuses includes a plurality of predefined application programming interfaces and executes a process corresponding to a called one of the plurality of application programming interfaces using the predetermined information stored in the plurality of first information processing apparatuses; and
        a plurality of third information processing apparatuses connected to a third network segment of the plurality of network segments, wherein, each of the plurality of third information processing apparatuses is configured to, in response to receiving a request for the cloud service from an external apparatus connected to the information processing system via a second network, control a process corresponding to the request by calling one of the plurality of application programming interfaces which corresponds to the request, and
    wherein the plurality of gateway apparatuses includes
        a first gateway apparatus that is connected to a fourth network segment of the plurality of network segments and determines whether to allow passage of a communication received via the second network, the fourth network segment being connected between the second network and the first through third network segments; and
        a second gateway apparatus, a third gateway apparatus, and a fourth gateway apparatus that are connected to the first network segment, the second network segment, and the third network segment, and determine whether to allow passage of the communication allowed to pass by the first gateway apparatus to the plurality of first information processing apparatuses, the plurality of second information processing apparatuses, and the plurality of third information processing apparatuses, respectively.

2. The information processing system as claimed in claim 1, further comprising:
    a plurality of firewalls each provided between corresponding two of the first, second, third, and fourth network segments,
    wherein communications among the first, second, third, and fourth network segments are restricted by the plurality of firewalls.

3. The information processing system as claimed in claim 1, wherein
    the plurality of information processing apparatuses further includes a plurality of fourth information processing apparatuses connected to a fifth network segment of the plurality of network segments, and
    one of the plurality of fourth information processing apparatuses monitors at least one of the plurality of first information processing apparatuses, the plurality of second information processing apparatuses, and the plurality of third information processing apparatuses.

4. The information processing system as claimed in claim 1, wherein the plurality of first information processing apparatuses, the plurality of second information processing apparatuses, and the plurality of third information processing apparatuses are installed as respective units classified by the functional commonality.

5. The information processing system as claimed in claim 1, wherein, in response to an authentication request from the external apparatus, one of the plurality of application programming interfaces which corresponds to the authentication request is allowed to be called without going through the third network segment.

6. The information processing system as claimed in claim 1, wherein the first, second, third, and fourth gateway apparatuses determine whether to allow the passage of the communication based on a URL of a destination of the communication.

7. The information processing system as claimed in claim 1, wherein each of the plurality of network segments is a unit of the first network where IP addresses have a common network address.

* * * * *